F. H. JOHNSON.
FLUID PRESSURE CHECK VALVE.
APPLICATION FILED JUNE 29, 1915.
1,200,842.
Patented Oct. 10, 1916.
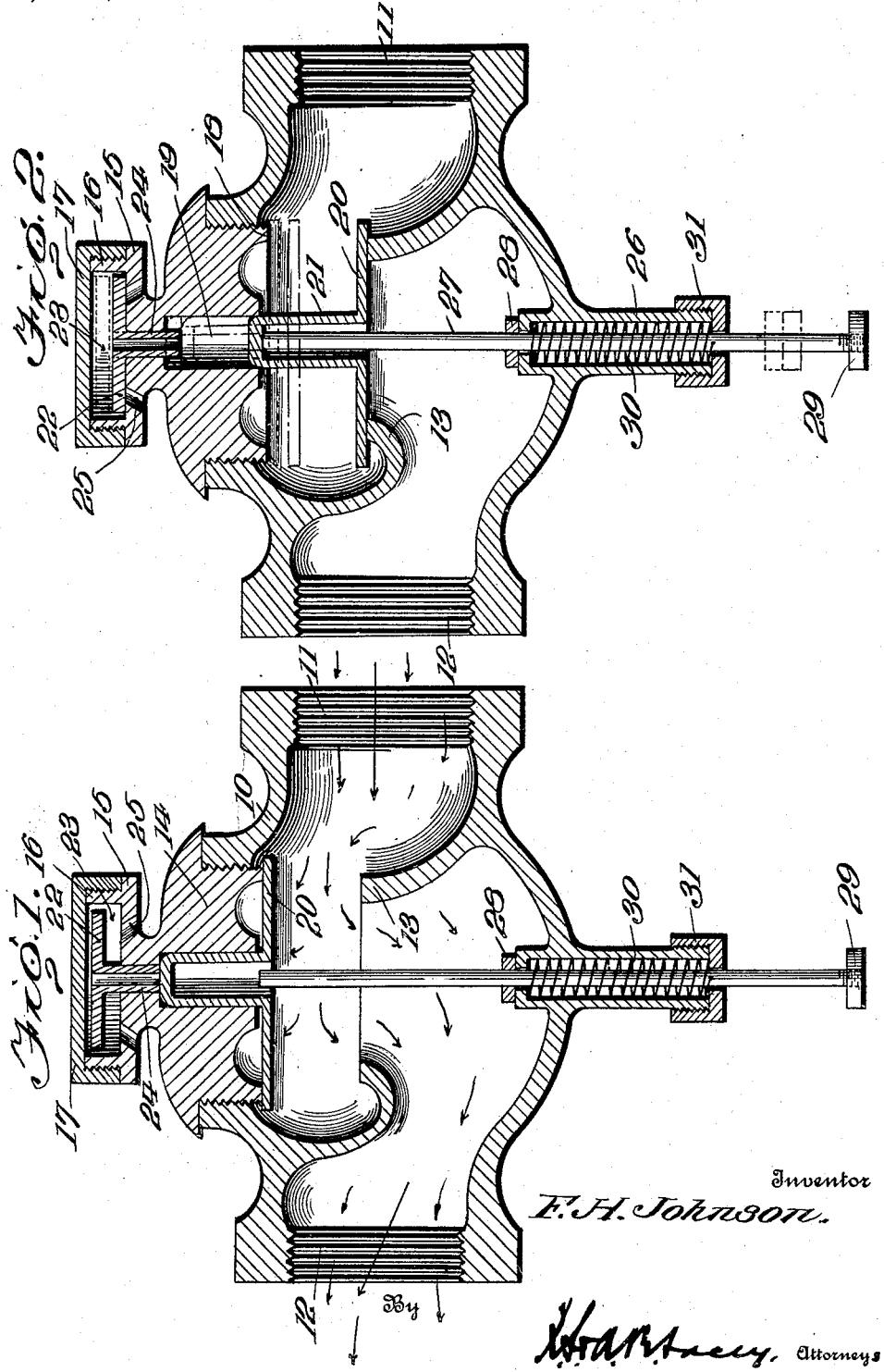
Inventor
F. H. Johnson.
By
Hartsuff, Attorneys

UNITED STATES PATENT OFFICE.

FRED H. JOHNSON, OF SAPULPA, OKLAHOMA, ASSIGNOR OF ONE-HALF TO FRANK J. HOUK, OF SAPULPA, OKLAHOMA.

FLUID-PRESSURE CHECK-VALVE.

1,200,842.  Specification of Letters Patent.  Patented Oct. 10, 1916.

Application filed June 29, 1915. Serial No. 37,055.

*To all whom it may concern:*

Be it known that I, FRED H. JOHNSON, a citizen of the United States, residing at Sapulpa, in the county of Creek and State of Oklahoma, have invented certain new and useful Improvements in Fluid-Pressure Check-Valves, of which the following is a specification.

This invention contemplates an improved check valve for fluid pressure systems and has as its primary object to provide a device of this character adapted to be interposed within the service line of the system to automatically cut off the flow of fluid therethrough when the pressure of the fluid within the system drops below normal.

The invention has as a further object to provide a device of this character wherein the valve will be held in open position by the normal pressure of the fluid within the system and wherein the valve will automatically move by gravity to cut off the flow of fluid through the system upon a reduction of the pressure thereof.

A still further object of the invention is to provide a device of this character wherein the valve will remain in closed position pending the manual operation thereof to open the valve and to also provide a simple means for moving the valve to open position.

The invention has as a further object to provide a device of this character having a primary cut off valve and a secondary valve adapted to coöperate therewith to vent the primary valve upon the manual shifting thereof to open position.

A still further object of the invention, in this connection, is to provide a gravity operated secondary valve movable to normally close communication between the primary valve and the outer air.

Other and incidental objects will appear as the description proceeds and in the drawings wherein I have illustrated the preferred embodiment of the invention and wherein similar reference characters designate corresponding parts throughout the several views, Figure 1 is a vertical sectional view of my improved device showing the valve in open position. Fig. 2 is a similar view showing the valve in closed position as well as indicating in dotted lines, the manner in which the valve is manually shifted to open position.

In carrying out my invention, I employ a hollow valve body 10 which is provided with an inlet port 11 and an outlet port 12. The terminals of the valve body are preferably internally screw threaded so that the valve may be easily interposed in a service line of a fluid pressure system. In this connection, it may be stated that my improved valve is especially adapted for use in connection with natural or artificial gas systems wherein the pressure of the fluid of such systems is subject to extreme variations from various causes. Formed interiorly of the valve body, at a point substantially midway its ends, is a web which provides an annular valve seat 13 arranged substantially parallel to the longitudinal axis of the valve body.

Formed in the valve body 10 upon the upper side thereof is an internally screw threaded opening in which is detachably fitted, an externally screw threaded plug 14, preferably provided with a radial flange as illustrated in the drawings, adapted to seat against the valve body. The plug 14 is formed with a reduced annular head 15 connected to the body of the plug by a reduced neck and formed on the upper side of the head adjacent the periphery thereof, is an annular externally screw threaded flange 16 detachably receiving the depending internally screw threaded flange of a cap or closure 17 which, at its free edge, abuts the peripheral margin of the head 15 with the flange 16 seating against the inner face of the cap body.

The plug 14, upon the inner end thereof, is cut away, as more particularly shown in Fig. 2 of the drawings, to provide a peripheral annular valve seat 18 and formed in the plug, is an axial annular bore or recess 19 which opens through the inner end thereof.

Arranged within the valve body to normally engage the valve seat 13, is an annular valve 20 which, axially thereof, is provided with an annular upstanding or laterally projecting hollow sleeve or stem 21, closed at its upper end and adapted to be freely received within the bore 19 to slide longitudinally therein. As shown in Fig. 2 of the drawings, the upper extremity of the sleeve 21 is adapted to extend within the adjacent lower extremity of the bore 19 when the valve 20 is in engagement with the valve seat 13 and thus provides a centering sleeve for the valve.

Removably fitted upon the head 15 of the plug 14 is an annular valve 22 which is freely received for movement within a vent chamber or valve chamber 23 defined between the cap 17 and the head. The valve 22 axially thereof is provided with a laterally extending depending hollow stem 24 which opens through the valve body and is snugly received for longitudinal shifting movement within a suitable bore extending from the valve chamber 23 through the reduced neck of the plug 14 to enter the bore 19 axially thereof. Formed in the head 15 upon opposite sides thereof are openings or vents 25 adapted to establish communication between the valve chamber 23 and the outer air and adapted to be closed by the valve 22, as shown in Fig. 2 of the drawings.

Formed on the valve body 10 upon the side thereof opposite the plug 14 and in alinement with the stem 21 of the valve 20 is a hollow laterally projecting sleeve 26 having its outer end open and its inner end, which preferably extends a slight distance within the valve body, closed and formed with a suitable opening which freely receives a push rod 27 extending through the sleeve. The push rod 27, at a point intermediate its ends, is provided with an annular stop shoulder 28 adapted to seat against the inner closed end of the sleeve 26 with the inner extremity of the said rod extending within the sleeve 21 of the valve 20 to normally engage the closed end of the said last mentioned sleeve, with the said valve engaging the valve seat 13.

The stem 27 is removably fitted within the sleeve 26 and at its outer extremity, is provided with a detachable head 29. Arranged within the sleeve 26 is a helical spring 30 which surrounds the rod 27 and which at one extremity, is arranged to bear against the closed end of the said sleeve while the opposite extremity of the spring is suitably connected to the rod. Closing the outer extremity of the sleeve 26 and having screw threaded engagement therewith, is a detachable cap 31 which is formed with a suitable opening freely receiving the rod 27. It will now be observed that the spring 30 will normally urge the push rod 27 to a position with the shoulder 28 thereof in engagement with the sleeve 26. In such position of the push rod, the valve 20 will normally gravitate to engage the valve seat 13 and thus provide a primary valve adapted to shut off communication between the inlet and outlet ports of the valve body. To open the primary valve, the rod 27 is moved upwardly against the action of the spring 30 when the stem 21 of the said valve will slide within the bore 19, to engage the stem 24 of the valve 22, as shown by dot and dash lines in Fig. 2 of the drawings.

Normally, the stem 24 of the valve 22 will project a slight distance into the bore 19 as illustrated in Fig. 2, so that when the valve 20 is moved upwardly as just described, the stem 21 of the primary valve will engage the stem 24 of the valve 22 to move the valve 22 upwardly within the valve chamber 23 and consequently open the vents 25.

When so moved upwardly by the push rod 27, the primary valve 20 may be shifted to engage the valve seat 18 of the plug 14 as illustrated by dotted lines in Fig. 2, in which position of the said valve, it will support the valve 22 in raised position within the valve chamber 23 with the vents 25 open, as also illustrated in dotted lines in this figure. The valve 22 is thus movable to establish communication between the bore 19 and the outer air and provides a secondary valve adapted to actively coöperate with the primary valve.

Assuming that the valve of the present invention is interposed in the service line of a natural or artificial gas system, the primary valve 20 may be shifted, as previously described, to open position in engagement with the valve seat 18 as shown in Fig. 1 of the drawings and consequently permit a flow of gas through the system. When so shifted, the normal pressure of the fluid of the system will support the valve in open position, the primary valve in turn being adapted to support the secondary valve 22. In this connection, and upon reference to Fig. 1 of the drawings, it will be observed that the primary valve, when shifted to open position, is movable to engage the valve seat 18, as previously set forth, and consequently shut off communication between the interior of the valve body and the recess 19 and, therefore, prevent the escape of gases through the secondary valve. Thus, in the open position of the valve 20, it will shut off communication between the interior of the valve body and the outer air.

As will now be readily seen, when the pressure of fluid within the service line of the system drops below normal, the primary valve 20 will gravitate to engage the seat 13, as shown in Fig. 2 of the drawings, and consequently shut off the flow of fluid through the valve, and will so remain, pending a manual operation of the push rod 27 to subsequently open the valve and reëstablish communication through the valve body. When the primary valve 20 is thus permitted to drop, the secondary valve 22 will be released and will gravitate to close the vents 25 to thus shut off communication between the bore 19 and the outer air and prevent the escape of the fluid of the system therethrough.

It will therefore be seen that my improved valve will be entirely automatic in its operation and will effectually prevent the many serious accidents now commonly experienced by persons using a fuel or light supply of gas from a system having either artificial or natural source of supply, due to the constant fluctuations in the pressure of the fluid of the system. In any instance where the primary valve 20 is allowed to drop and cut off the supply of gas through the valve body, due to the lowering of the pressure within the system and the pressure is then again raised, such pressure will only serve to urge the valve to closed position. Upon the subsequent manual opening of the valve 20, the stem 24 will move within the bore 19 to a position to lift the secondary valve 22, thus venting the bore 19 and allowing the engagement of the primary valve with the seat 18.

While I have indicated that the primary and secondary valves are gravity actuated, still, it will be understood that these valves could be spring actuated for urging the valves to normal position, this modification in structure being entirely within the spirit of the present invention and I, therefore, do not wish to limit myself in this regard.

Having thus described my invention, what I claim and desire to secure by Letters Patent is:

1. A device of the character described including a valve body having inlet and outlet ports and provided with a vent chamber, a primary valve shiftable to shut off communication between the said ports, and a secondary valve normally gravitating to closed position within the said chamber with the said secondary valve adapted to be urged to said position by fluid pressure within the said body, the secondary valve being adapted to coact with the primary valve for venting the primary valve through the said chamber upon the movement of the primary valve to open position.

2. A device of the character described including a valve body having inlet and outlet ports and provided with a vent chamber, a primary valve shiftable to shut off communication between the said ports, and a secondary valve having a hollow stem establishing communication between the valve body and said chamber with the said secondary valve normally gravitating to closed position within the said chamber and adapted to be urged to said position by fluid pressure within the said body, the secondary valve being adapted to coact with the primary valve for venting the primary valve through the said chamber upon the movement of the primary valve to open position.

3. A device of the character described including a valve body having inlet and outlet ports and provided with a valve chamber having a vent in a wall thereof, a primary valve shiftable to shut off communication between the said ports, and a secondary valve mounted in said chamber and having a hollow stem establishing communication between the valve body and said chamber with the said secondary valve normally gravitating to closed position overlying the said opening in engagement with the said wall to be urged to said position by fluid pressure within the valve body, the said secondary valve being adapted to coact with the primary valve for venting the primary valve through said opening upon the movement of the primary valve to open position.

In testimony whereof I affix my signature.

FRED H. JOHNSON.

Copies of this patent may be obtained for five cents each, by addressing the "Commissioner of Patents. Washington, D. C."